United States Patent
Kobayashi et al.

(10) Patent No.: US 7,771,799 B2
(45) Date of Patent: Aug. 10, 2010

(54) LIQUID CRYSTAL-SOLUBLE PARTICLE, METHOD FOR MANUFACTURING THE SAME AND LIQUID CRYSTAL DEVICE ELEMENT

(75) Inventors: Shunsuke Kobayashi, 13-40, Nishi-oizumi 3-chome, Nerima-ku, Tokyo (JP); Naoki Toshima, 3-5-511, Nishidai 4-chome, Itabashi-ku, Tokyo (JP); Jirakorn Thisayukta, Kanagawa (JP); Yukihide Shiraishi, Yamaguchi (JP); Shigenobu Sano, Saga (JP); Atsushi Baba, Tokyo-to (JP)

(73) Assignees: Shunsuke Kobayashi, Tokyo (JP); Naoki Toshima, Tokyo (JP); Dai Nippon Printing Co., Ltd., Tokyo-to (JP)

(*) Notice: Subject to any disclaimer, the term of this patent is extended or adjusted under 35 U.S.C. 154(b) by 0 days.

(21) Appl. No.: 10/823,105

(22) Filed: Apr. 13, 2004

(65) Prior Publication Data

US 2005/0079296 A1 Apr. 14, 2005

(30) Foreign Application Priority Data

Apr. 14, 2003 (JP) ............................ 2003-109567

(51) Int. Cl.
*C09K 19/58* (2006.01)
(52) U.S. Cl. ..................... 428/1.1; 349/33; 349/166
(58) Field of Classification Search ................. 428/1.1, 428/407, 837, 842.3, 546, 558; 349/166, 349/33–36, 661
See application file for complete search history.

(56) References Cited

U.S. PATENT DOCUMENTS 4,370,647 A * 1/1983 Brantingham ................ 345/94

(Continued)

FOREIGN PATENT DOCUMENTS

DE 10135114 2/2003

(Continued)

OTHER PUBLICATIONS

German Office Action, German Patent Appln. No. 11-2004-000-608.2-43, Mar. 9, 2007.

(Continued)

*Primary Examiner*—Sophie Hon
(74) *Attorney, Agent, or Firm*—Ladas & Parry LLP

(57) ABSTRACT

A LCD device element of frequency modulation mode enables high speed on and off control of an electro-optical response by switching the frequency of applied electric field. The LCD device element is capable of changing a frequency modulation range freely. The LCD device element has conductive layers between two parallel substrates; liquid crystal (LC) alignment layers with pre-tilt angle on these conductive layers; and a LC layer between the two liquid crystal alignment layers. LC soluble particles (nanoparticles composing a core and a liquid crystal molecules or like molecules on its periphery), are in the LC layer. A control circuit applies voltage while modulating frequency on the conductive layer for varying light transmittance of the LC layer. Under a constant voltage, an electro-optical response is turned on by switching the frequency from low to high frequency and is turned off by switching the frequency from high to low frequency. The electro-optical response is varied also by varying voltage.

5 Claims, 4 Drawing Sheets

5CB-Ag-5CB(5) (1%)

A) RISING TIME CONSTANT: 2.6 ms

B) RISING TIME CONSTANT: 9.2 ms

CONDITION: V=4V; $f_1$=10Hz; $f_2$=12KHz

U.S. PATENT DOCUMENTS

| | | | | |
|---|---|---|---|---|
| 4,701,024 | A * | 10/1987 | Kobayashi et al. | 349/166 |
| 4,836,654 | A * | 6/1989 | Fujimura et al. | 349/170 |
| 4,909,605 | A * | 3/1990 | Asano et al. | 349/179 |
| 5,645,758 | A | 7/1997 | Kawasumi et al. | |
| 5,759,230 | A * | 6/1998 | Chow et al. | 75/362 |
| 5,932,309 | A * | 8/1999 | Smith et al. | 428/46 |
| 6,254,662 | B1 * | 7/2001 | Murray et al. | 75/348 |
| 6,262,129 | B1 * | 7/2001 | Murray et al. | 516/33 |
| 6,304,239 | B1 * | 10/2001 | McKnight | 345/87 |
| 6,376,029 | B1 * | 4/2002 | Suzuki et al. | 252/299.01 |
| 6,392,785 | B1 * | 5/2002 | Albert et al. | 359/296 |
| 6,645,444 | B2 * | 11/2003 | Goldstein | 423/1 |
| 6,712,997 | B2 * | 3/2004 | Won et al. | 252/503 |
| 6,875,253 | B2 * | 4/2005 | Daimon et al. | 75/255 |

FOREIGN PATENT DOCUMENTS

| | | |
|---|---|---|
| EP | 1 060 012 B1 | 8/2003 |
| JP | 08-015680 | 1/1996 |

OTHER PUBLICATIONS

Kobayashi, Shunsuke, "Next Generation Liquid Crystal Display", Sep. 2002, Kyoritsu Shuppan Co., Ltd., chapters 4 and 8.

Schadt, M., "Low-Frequency Dielectric Relaxations in Nematics and Dual-Frequency Addressing of Field Effects", Apr. 6, 1982, *Mol. Cryst. Liq cryst.*, vol. 89, pp. 77-92.

Yoshikawa, Hiroaki, et al., "Frequency Modulation Response of a Tunable Birefringent Mode Nematic Liquid Crystal Electrooptic Device Fabricated by Doping Nanoparticles of Pd Covered with Liquid-Crystal Molecules", Nov. 2002, *Jpn. J. Appl. Phys.*, vol. 41, pp. L1315-L1317.

Shiraishi, Yukihide, et al., "Frequency Modulation Response of a Liquid-Crystal Electro-Optic Device Doped with Nanoparticles", Oct. 2002, *Applied Physics Letters*, vol. 81, No. 15, pp. 2845-2847.

* cited by examiner

LIQUID CRYSTAL-SOLUBLE PARTICLE, METHOD FOR MANUFACTURING THE SAME AND LIQUID CRYSTAL DEVICE ELEMENT

BACKGROUND OF THE INVENTION

1. Field of the Invention

The present invention relates to a high speed response liquid crystal device element having frequency dependency, in addition to amplitude of driving voltage, to an electro-optical response and related to liquid crystal-soluble particles for doping into a liquid crystal of this liquid crystal device element, and a method for manufacturing the same.

2. Description of the Related Art

In an electro-optical device element or a display device element using a liquid crystal, a liquid crystal is filled into a liquid crystal cell. A liquid crystal cell using a nematic liquid crystal is widely used mainly as a matrix liquid crystal displays (hereinafter, referred to as "LCDs" in some cases) in computer monitors, televisions, and mobile equipments such as portable telephones and the like.

However, an LCD using a nematic liquid crystal (hereinafter, referred to as "NLCDs" in some cases) has a problem that its time constant is as long as 12 ms to 200 ms, indicating slow response speed, consequently, moving video images cannot be displayed sufficiently.

As a method for increasing the speed of an electro-optical response of a liquid crystal device element, there are trials of using (1) ferroelectric liquid crystal, (2) nematic bent mode, (3) flexo electric effect, (4) dual frequency driving and other modes (see M. Schadt, Mol. Cryst. Liq. Cryst. 89(1982), 77). Ferroelectric liquid crystal, nematic bent mode, flexo electric effect and the like depend only on amplitude of driving voltage or the average value of the amplitude and do not depend on frequency. Modes such as dual frequency driving and the like depend on frequency.

Regarding a ferroelectric liquid crystal as a high speed response LCDs, it has become apparent that a defect-free polymer stable ferroelectric liquid crystal device element by Shunsuke KOBAYASHI et al. shows a high speed response and manifests excellent practicability, as described in "Next generation liquid crystal display", Shunsuke KOBAYASHI ed., KYORITSU SHUPPAN CO., LTD., September 2002, chapters 4 and 8. However, the nematic bent mode and flexo electric effect are not in practical use yet.

Moreover, the dual frequency driving mode is a mode of imparting frequency dependency as an electro-optical property by a mixture of liquid crystals. However, since usable liquid crystal substances are limited, this mode is not yet in practical use because the frequency range cannot be selected freely, operating voltage is high, and frequency dependency of on-off is reverse, namely, this mode has not reached practical use.

The present inventors have noticed, as a method for solving the above mentioned problems, that if driving of frequency modulation mode is made possible, a high speed electro-optical response can be obtained by switching the frequency of applied electric field (voltage). According to this method, contrast ratio of an electro-optical response can be continuously changed by varying applied electric field amplitude by conventional methods. And additionally, a liquid crystal device element of such a frequency modulation mode can be driven by an active matrix mode, simultaneously.

On the other hand, NLCDs showing a frequency modulation response have been already reported by Shunsuke KOBAYASHI (H. YOSHIKAWA et al., Jpn. J. Appl. Phys., 41(2002) L1315 and Y. SHIRAISHI et al., Appl. Phys. Lett., 81(2002) 2845). However, only palladium nanoparticles are used in these references, and in this system, the frequency modulation range is limited to 10 Hz to 100 Hz, therefore, the range of application and practical use is limited.

As a result of the above-described matters, it is desired to provide a liquid crystal device element of frequency modulation mode enabling control of on-off of an electro-optical response at high speed by switching the frequency of applied electric field and further, capable of changing a frequency modulation range freely from several Hz to several kHz or more.

SUMMARY OF THE INVENTION

The present inventors have intensively studied in view of the above mentioned conditions. And resultantly found that, without changing various operating mode conventionally used, a frequency dependency of a wide range can be imparted to an electro-optical response by adding and dispersing nanoparticles, protected with a liquid crystal molecules or liquid crystal-like molecules, into a liquid crystal layer and that a high speed electro-optical response can be obtained by switching the frequency of applied electric field, thus leading to completion of the invention.

That is, the present invention provides a liquid crystal-soluble particle comprising: a core composed of one or a plurality of nanoparticles; and a protective layer composed of liquid crystal molecules or liquid crystal-like molecules provided on its periphery.

On the above mentioned liquid crystal-soluble particle, it is preferable that the diameter of the core is 1 nm to 100 nm, and it is preferable that the short axis width of the liquid crystal molecule or liquid crystal-like molecule is equal to or less than the diameter of the core.

The present invention also provides a method for manufacturing a liquid crystal-soluble particle, wherein the nanoparticle is a metal nanoparticle made of metal and a plurality of metal ions are reduced in a solution containing the liquid crystal molecules or liquid crystal-like molecules to allow the liquid crystal molecules or liquid crystal-like molecules to bond to the periphery of the metal nanoparticle to form a particles.

In this case, it is preferable that the metal nanoparticle is made of at least one kind of metal atom selected from Ag, Pd, Au, Pt, Rh, Ru, Cu, Fe, Co, Ni, Sn and Pb. Further, it is preferable that the metal ion is chosen from at least one metal salt among metal halides, metal acetates, metal perhalogenates, metal sulfates, metal nitrates, metal carbonates and metal oxalates, as a starting raw material.

The present invention also provides a liquid crystal device element comprising: a pair of parallel substrates; a conductive layers provided respectively on facing inner surfaces of these substrates; liquid crystal alignment layers provided respectively with pre-tilt angle on facing inner surfaces of these conductive layers; and a liquid crystal layer formed in between these pair of liquid crystal alignment layers, wherein the liquid crystal-soluble particles are dissolved or dispersed in the liquid crystal layer.

In this case, it is preferable that a control circuit of applying voltage, while modulating at least frequency among frequency and voltage, is provided on the conductive layer for varying light transmittance of the liquid crystal layer, and under a constant applied voltage, an electro-optical response is turned on by switching the frequency of applied electric field from low frequency to high frequency, and the electro-optical response is turned off by switching the frequency from high frequency to low frequency.

In the liquid crystal device element of the present invention, the liquid crystal-soluble particles constituted of a core composed of nanoparticles and liquid crystal molecules or liquid crystal-like molecules provided on its periphery are dissolved or dispersed in a liquid crystal layer. Therefore, on-off of a high speed electro-optical response can be controlled by switching the frequency of applied electric field.

In the above mentioned liquid crystal device element, it is preferable that a time constant of response concerning turning the electro-optical response on and off is in a range of 0.1 ms to 10 ms, and it is preferable that a frequency modulation range of the electro-optical response is in a range of 20 Hz to 100 kHz. Further, it is preferable that the nanoparticle constituting the liquid crystal-soluble particle is at least one kind of metal atom selected from Ag, Pd, Au, Pt, Rh, Ru, Cu, Fe, Co, Ni, Sn and Pb.

The present invention further provides a method for driving a liquid crystal device element, wherein the liquid crystal device element is driven by using an active matrix mode.

According to the present invention, on-off of an electro-optical response of a liquid crystal device element can be controlled not only by applied voltage but also by its frequency. Moreover, by varying the kind, combination and concentration of nanoparticles, a controllable frequency range can be freely selected between several Hz and several hundreds kHz.

The liquid crystal device element of the present invention can perform high speed switching of 10 times to 100 times faster, as compared with conventional device elements, by switching the frequency of applied electric field. Such a liquid crystal device element of the present invention can be applied to all types of operating modes, and can realize a high speed response. This high speed response mode can be applied to a nematic liquid crystal display modes. Further, also in a case of a ferroelectric liquid crystal display, since normal dielectric property and ferroelectricity are combined in operation, a high speed response can be realized by applying the present mode. These liquid crystal device elements can all driven by an active matrix mode.

DESCRIPTION OF THE PREFERRED EMBODIMENT

Figure 1:
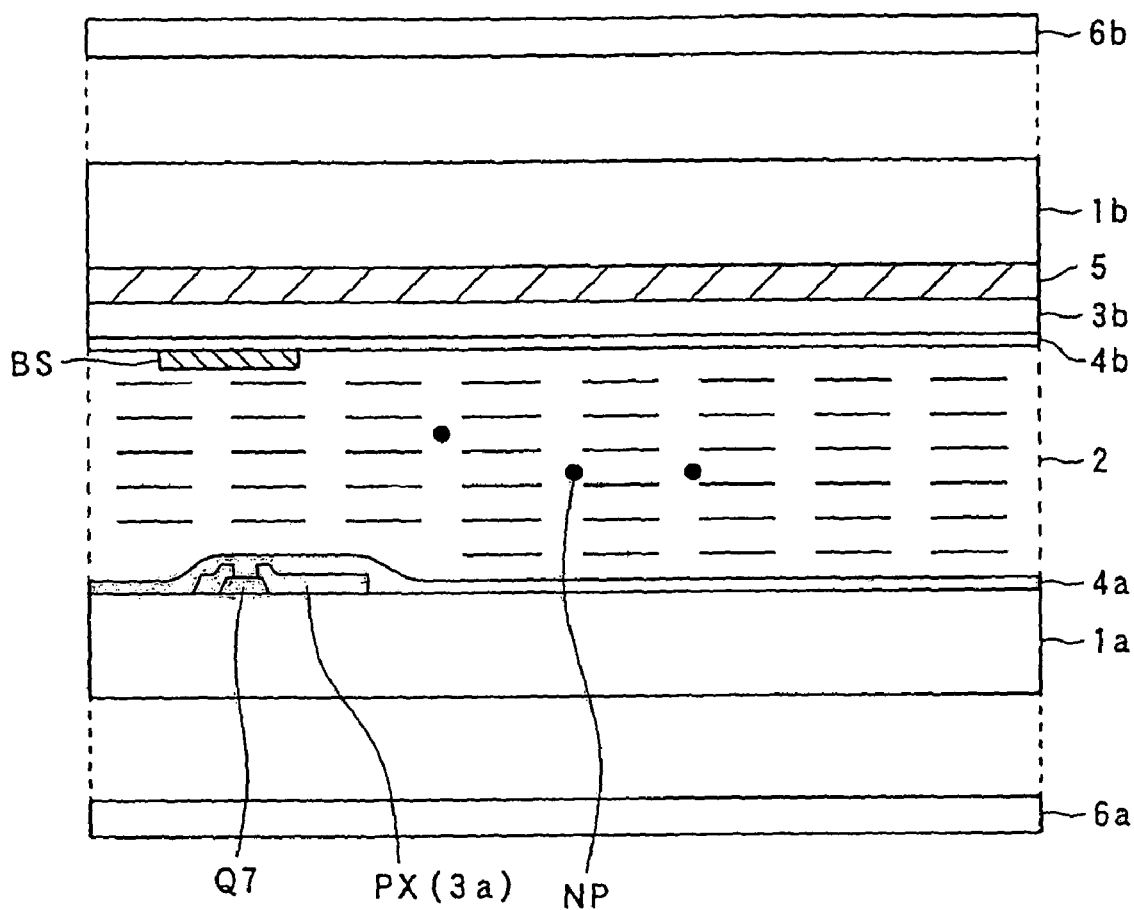
FIG. 1 is a schematic sectional view showing one example of the liquid crystal device element of the present invention.

The liquid crystal device element of the present invention will be explained in detail below.

[1] Liquid Crystal Device Element

The liquid crystal device element of the present invention is a liquid crystal device element comprising a pair of parallel substrates; conductive layers provided respectively on facing inner surfaces of these substrates; liquid crystal alignment layers provided respectively with pre-tilt angle on facing inner surfaces of these conductive layers; and a liquid crystal layer formed in between these pair of liquid crystal alignment layers, wherein liquid crystal-soluble particles, comprising a core composed of nanoparticles and a liquid crystal molecules or liquid crystal-like molecules provided on its periphery, are dissolved or dispersed in the above mentioned liquid crystal layer. And thus manufactured complex body (mixed system) is a liquid crystal device element wherein a control circuit of applying voltage while modulating at least frequency among frequency and voltage is provided for varying light transmittance of the liquid crystal layer, and under a constant applied voltage, an electro-optical response as a light modulating device element is turned on by switching the frequency of applied electric field from low frequency to high frequency, and the electro-optical response is turned off by switching the frequency from high frequency to low frequency. Under this state, an electro-optical response can be varied also by varying voltage.

In the present invention, by protecting these nanoparticle with a liquid crystal molecules or liquid crystal-like molecules, when frequency dependency is imparted to an electro-optical response of a liquid crystal device element, by way of dissolving or dispersing nanoparticles in a liquid crystal layer, dispersion of nanoparticles in a liquid crystal layer can be improved and a free selection of controllable frequency range in a range of several Hz to few score kHz or more becomes possible.

The reason, why the nanoparticles thus can impart frequency dependency to an electro-optical response of a liquid crystal device element, will be described below.

At the interface between a matrix liquid crystal and nanoparticles, oscillating electric dipoles are formed by applied alternating electric field. Consequently, excess Debye type dielectric dispersion by nanoparticles is generated. In this case, excess dielectric dispersion by nanoparticles is generated in a frequency range near $\omega\tau=1$, and its relaxation time is represented by the following formula when the dielectric constant of a matrix liquid crystal is $\in_1$, its conductivity is $\sigma_1$, and the dielectric constant of a nanoparticle is $\in_2$, its conductivity is $\sigma_2$.

$$\tau = \frac{2\varepsilon_1 + \varepsilon_2}{2\sigma_1 + \sigma_2}$$

This phenomenon is known as a Maxwell-Wagner effect relating to an inhomogeneous dielectric materials, and in the present invention, a relaxation time constant of excess dielectric dispersion in a liquid crystal layer is controlled by the kind and concentration (number of particles per unit volume) of nanoparticles, and by this, an electro-optical response of a liquid crystal device element can be imparted with a frequency dependency. In this mechanism, in the present invention, by protecting nanoparticles with a liquid crystal molecule or liquid crystal-like molecule, dispersion of nanoparticles in a liquid crystal layer can be improved, and a frequency modulation in a wider range becomes possible. In this treatment, such a frequency modulation property of photoconductivity can be changed by irradiation with light, in a case of nanoparticles.

By this, brightness of display can be continuously changed by the frequency of applied electric field. Further, the electro-optical response of a liquid crystal device element can be turned on by switching the driving frequency from low frequency to high frequency and can be turned off by switching the frequency from high frequency to low frequency. A high speed response of 10 times to 100 times, as compared with conventional device elements, can be realized.

FIG. 1 shows a schematic sectional view of a liquid crystal device element driven by an active matrix mode, as one example of the liquid crystal device element of the present invention. A pair of parallel substrates 1a, 1b and, on facing inner surfaces thereof, transparent conductive layers 3a, 3b are provided. On facing inner surfaces of the transparent conductive layers, liquid crystal alignment layers 4a, 4b are provided and a liquid crystal layer 2 is placed in between these liquid crystal alignment layers 4a, 4b. In the liquid crystal layer 2, liquid crystal-soluble particles NP are dispersed. On the substrate 1a, a thin film transistor (TFT) Q7 and a pixel electrode PX (transparent conductive layer 3a) are placed. On the upper substrate 1b, a black stripe BS is placed on the side contacting with the liquid crystal layer, and a transparent conductive layer 3b and a color filter 5 are placed in between the substrate 1b and the liquid crystal alignment layer 4b. On the outside of both substrates, two polarizing sheets 6a, 6b are placed. Hereinafter, each component of the liquid crystal device element of the present invention will be described specifically referring to FIG. 1.

(1) Liquid Crystal Layer

The liquid crystal layer 2 used in the present invention is constituted of liquid crystal-soluble particles NP comprising a core composed of nanoparticles and liquid crystal molecules or liquid crystal-like molecules provided on its periphery, the liquid crystal-soluble particles being dissolved or dispersed in a matrix liquid crystal. Dielectric anisotropy of the matrix liquid crystal and the liquid crystal molecule or liquid crystal-like molecule provided on the periphery of nanoparticles may be positive or negative, and for enabling wider range frequency modulation, it is preferable that they show mutually opposite property.

Examples of the matrix liquid crystal include cyanobiphenyls, cholesteryl esters, carbonates, phenyl esters, Schiff bases, benzidines, azoxybenzenes, ferroelectric liquid crystals having a chiral group, liquid crystal polymers and the like.

Figure 2:
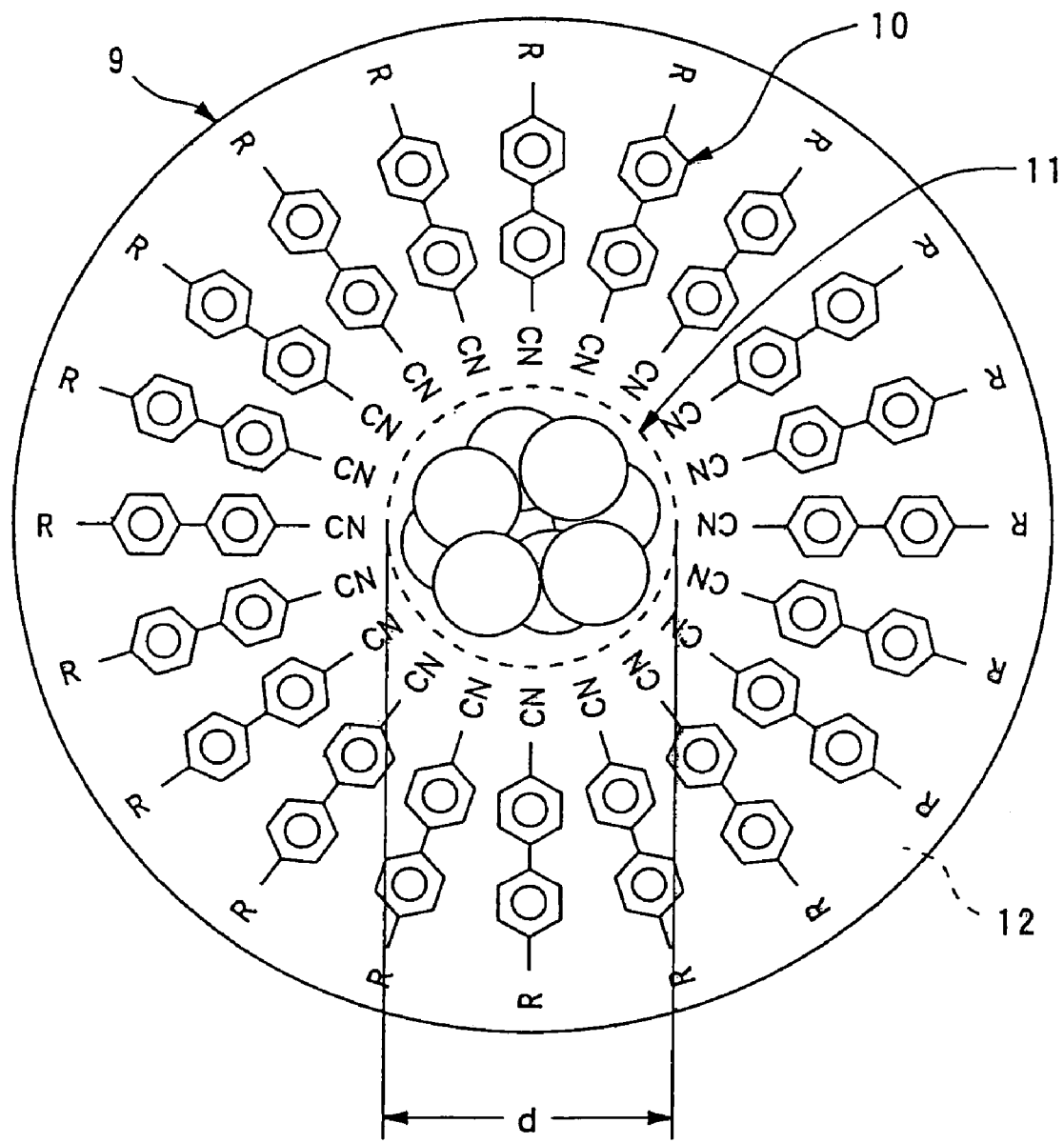
FIG. 2 is a schematic view showing one example of the liquid crystal-soluble particle of the present invention.

The liquid crystal-soluble particle is constituted, as shown in FIG. 2, a core 11 composed of one or a plurality of nanoparticles and a protective layer 12 composed of liquid crystal molecules or liquid crystal-like molecules 10 provided on its periphery.

Here, the diameter d of the core 11 composed of nanoparticles is 1 nm to 100 nm.

The protective liquid crystal molecule or liquid crystal-like molecule 10 is variously selected as described later, and the short axis width of the liquid crystal molecule or liquid crystal-like molecule 10 is set to be equal to or less than the diameter of the above mentioned core 11.

Nanoparticles are not particularly limited as long as these are fine particles having a particle diameter smaller than 100 nm, and listed are metal nanoparticles, semi-metal nanoparticles, semiconductor nanoparticles, inorganic nanoparticles and organic nanoparticles. These nanoparticles may be used singly or in combination of two or more. The semi-metal includes Bi, Te and the like, the semiconductor includes CdS, CdSe, the magnetic particle includes FePt, CoPt, MPt, MPd, the inorganic substance includes $Fe_2O_3$, $TiO_2$, $Al_2O_3$, $SiO_2$, and the organic substance includes $C^{60}$ system, carbon nanotube and the like. Among them, the metal nanoparticles are preferably used since an electro-optical response in wider frequency modulation range can be realized. And more preferably, at least one metal atom selected from Ag, Pd, Au, Pt, Rh, Ru, Cu, Fe, Co, Ni, Sn and Pb is mentioned. Among these metal atoms, Ag, Pd and Cu are preferably used singly or in admixture, and particularly Ag is preferable since its frequency modulation range is extremely wide. And a frequency modulation range corresponding to use can be freely selected by changing a combination of Ag with other metal atoms, for example, Pd and the like and concentration (number of particles per unit volume).

Specifically, pentylcyanobiphenyl as a protective liquid crystal molecule, Ag as a metal nanoparticle, and a molar ratio of liquid crystal molecule to metal of 5 to 50 and an addition concentration of 1 wt % to 3 wt %, are selected.

In the above mentioned case, the core 11 is constituted of metal ions such as Pd and the like, and to obtain from metal ions, halides of the above mentioned metals, and metal salts of various acids such as metal acetates, metal perhalogenates, metal sulfates, metal nitrates, metal carbonates, metal oxalates and the like may be advantageously used as a starting material.

In the case of nanoparticles of inorganic substances (oxide) or compound semiconductors other than metal, it is synthesized by carrying a reaction of bulk-synthesis of them in the presence of polyvinylpyrrolidone.

As the liquid crystal molecule or liquid crystal-like molecule 10 constituting the protective layer 12, at least one of, for example, cyanobiphenyls such as 4-cyano-4'-n-pentylbiphenyl, 4-cyano-4'-n-heptyloxybiphenyl and the like; cholesteryl esters such as cholesteryl acetate, cholesteryl benzoate and the like; carbonates such as 4-carboxyphenyl ethyl carbonate, 4-carboxyphenyl n-butyl carbonate and the like; phenyl esters such as phenyl benzoate, biphenyl phthalate and the like; Schiff bases such as benzylidene-2-naphthylamine, 4'-n-butoxybenzylidene-4-acetylaniline and the like; benzidines such as N,N'-bisbenzylidenebenzidine, p-dianisarbenzidine and the like; azoxybenzenes such as 4,4'-azoxydianisole, 4,4'-di-n-butoxyazoxybenzene and the like; liquid crystal polymers such as poly(p-phenyleneterephthalamide) and the like is used. Liquid crystal-like molecules having a structure resembling that of liquid crystal molecules such as 4-mercapto-4'-n-biphenyl, 4-cyano-4'-(ω-mercaptopentyl)biphenyl and the like can also be used.

Among these liquid crystal molecules or liquid crystal-like molecules, liquid crystal molecules or liquid crystal-like molecules 10 showing a strong mutual action with metals are preferable in the case of using metal nanoparticles, and for example, aromatic or aliphatic liquid crystal molecules or liquid crystal-like molecules having a cyano group, thiol group, amino group, carboxyl group and the like are mentioned.

A liquid crystal-soluble particle is formed by reducing a plurality of metal ions in a solution containing the liquid crystal molecule or liquid crystal-like molecule 10 to bond the liquid crystal molecule or liquid crystal-like molecule to the periphery of the core 11.

The using amount of the liquid crystal molecule or liquid crystal-like molecule 10 may be 1 mol or more, preferably 1 to 50 mol per 1 mol of metal constituting the core 11. When the liquid crystal molecule or liquid crystal-like molecule 10 is a polymer, the using amount is determined in terms of mol number per unit monomer.

As the solvent for forming a metal ion-containing liquid, water, alcohols, ethylene glycols and ethers are listed.

The content of the above mentioned liquid crystal-soluble particle in a liquid crystal layer may be appropriately selected depending on use, and it is 10 wt % or less, preferably 5 wt % or less, more preferably 1 wt % or less based on a matrix liquid crystal.

(2) Substrate

It is preferable that at least one of the substrates 1a and 1b is transparent, and the substrate is constituted of glass or transparent resin having a thickness of about 1 mm.

(3) Conductive Layer

It is preferable that the conductive layer is transparent, namely, has high visible light transmittance, and has high electric conductivity. Specifically, materials such as ITO, ZnO, $In_2O_3$—ZnO and the like are used, and a membrane is formed by a sputtering method and the like.

The conductive layer functions as an electrode of a liquid crystal device element, and when the liquid crystal device element of the present invention is driven by an active matrix mode, an conductive layer provided on an inner surface of the lower substrate constitutes a pixel electrode and a tow-dimensional array of switching device elements such as a thin film transistor (TFT) and the like.

Further, a black stripe placed on the side contacting a liquid crystal layer of the upper substrate 1b absorbs an external ray to decrease reflection light from a screen (reduction of influence by external light), and allows efficient transmission of light from the rear surface to the front surface of a screen by a lenticular lens. The black stripe is made, for example, of a resin black and metal such as chromium and the like manifesting relatively low reflectance, and provided so as to compart (boundary) each dye layer of R, G and B of a color filter 5.

(4) Liquid Crystal Alignment Layer

The liquid crystal alignment layer is treated so as to give horizontal or vertical alignment with pre-tilt angle depending on the operating mode of a liquid crystal device element, and may be provided on at least one of two substrates. The liquid crystal alignment layer is usually formed by known methods such as, for example, coating and calcination of a polyimide and the like.

(5) Polarizing Sheet, Color Filter and the Like

Polarizing plates 6a, 6b are provided on both sides of a substrate, however, when used in reflection type, a light reflecting plate is placed on the lower substrate 1a, and one polarizing plate may be used.

Moreover in between the substrate 1b and the conductive layer 3b, a color filter 5 for displaying colors of R, G, B (Red, Green, Blue) is provided.

The control circuit used in the present invention is a control circuit capable of applying voltage while modulating at least frequency among frequency and voltage.

The cell gap in between the liquid crystal alignment layers 4a, 4b is about 5 μm. In FIG. 1, a spacer for forming the cell gap and a sealing material for sealing a liquid crystal in each cell are not shown.

[2] Property of Liquid Crystal Device Element

The liquid crystal device element of the present invention has the above mentioned constitution, and consequently, under a constant applied voltage, the electro-optical response is turned on by switching the frequency of applied electric field from low frequency to high frequency, and the electro-optical response is turned off by switching the frequency of applied electric field from high frequency to low frequency.

The reason, why such control of on-off of an electro-optical response is possible, is that by applying a predetermined voltage to a conductive layer and between pixel electrodes from a control circuit, the alignment direction of a liquid crystal molecule of liquid crystal-soluble particles contained in a liquid crystal layer changes, and the alignment angle is adjusted depending on the frequency of applied electric field at the time. A liquid crystal molecule of a matrix liquid crystal is aligned in a direction perpendicular to a liquid crystal-like molecule of a liquid crystal-soluble particle, and scattering of a light transmitted through a liquid crystal layer changes. Thus, light transmittance of a liquid crystal device element of the present invention is thus modulated depending on the frequency of applied electric field.

In the present invention, the time constant of a response in relation to on and off of an electro-optical response can be 0.02 ms to 10 ms, preferably 0.1 ms to 5 ms, more preferably 0.1 ms to 1 ms, and an electro-optical response time constant corresponding to an use can be obtained by controlling the kind and combination of nanoparticles used for a liquid crystal-soluble particle, and in the case of using two or more kinds of nanoparticles, by controlling its concentration.

In the present invention, the frequency modulation range of an electro-optical response can be 20 Hz to 100 kHz, preferably 20 Hz to 50 kHz, more preferably 20 Hz to 10 kHz, and frequency modulation corresponding to an use can be obtained by controlling the kind and combination of nanoparticles used for a liquid crystal-soluble particle, and in the case of using two or more kinds of nanoparticles, by controlling its concentration.

In the liquid crystal device element of the present invention, frequency modulation can thus be set in a wider range. Consequently, when the value of applied voltage is appropriately selected, the contrast ratio of an electro-optical response can also be varied continuously, therefore, an electro-optical response of half tone can also be obtained. In this case, half tone display is realized by frequency modulation itself or by a combination of this with voltage amplitude modulation, since the range of frequency modulation is widened, and the degree of freedom of its selection is increased.

The operating mode of the liquid crystal device element of the present invention is not particularly limited. In an operating mode using a nematic liquid crystal such as twisted nematic (TN) LCD, STN-LCD, VAN-LCD and the like, or in an operating mode using a ferroelectric liquid crystal such as a chiral smectic liquid crystal such as FLCD and the like, a system in which the dielectric constant or its anisotropy of a matrix liquid crystal depends on the frequency of applied electric field can improve the response speed by switching of the frequency of applied electric field.

[3] Method for Driving of Liquid Crystal Device Element

Next, a method for driving the liquid crystal device element of the present invention by using an active matrix mode will be described.

As the liquid crystal device element driven by an active matrix mode, that in which a thin film transistor (TFT) Q7 and a pixel electrode PX (transparent conductive layer 3a) are place on the lower substrate, is used among the above mentioned liquid crystal device elements.

In the active matrix mode, a liquid crystal device element is driven by applying predetermined voltage to each of a plurality of drain electrodes and gate electrodes provided for every pixel, and an conductive layer placed on the side facing a liquid crystal layer.

For example, a gate signal is imparted to an $X_i$ electrode of X-Y matrix display, and signal voltage is applied to a $Y_j$ electrode. In this case, a signal voltage $v_{ij}$ ($t_i$, $\Delta_t$, $f_j^k$) is imparted. In the present invention, by switching the frequency $f_j^k$ between $f_j^1$ and $f_j^2$ in this procedure, on-off of an electro-optical response of a liquid crystal device element can be realized.

Further, by changing the amplitude of a signal voltage $v_{ij}$ ($t_i$, $\Delta_t$, $f_j^k$) in this procedure, an electro-optical response of half tone can be obtained. In this signal voltage, time is in $t_1+\Delta_t$, amplitude is $v_{ij}$ and its frequency is $f_j^k$.

The present invention is not limited to the above mentioned embodiments. The above mentioned embodiments are only examples, and any embodiment, which has substantially the same constitution and similar function and effect as the technological idea described in claims of the present invention, is included in the technological range of the present invention.

EXAMPLES

The present invention will be explained further specifically using the following examples.

Example 1

An effect of the invention was confirmed by TN-LCD, ECB(TB)-LCD, GH-LCD as LCDs using a nematic liquid crystal. Hereinafter, an example employing TN-LCD will be explained.

Pentylcyanobiphenyl (hereinafter, referred to as "5CB" in some cases) was used as a matrix liquid crystal and a liquid crystal device element, wherein a thickness of liquid crystal is 5 µm, using silver (Ag) as a nanoparticle and 5CB as a liquid crystal for protecting the nanoparticle, was manufactured.

Figure 3:
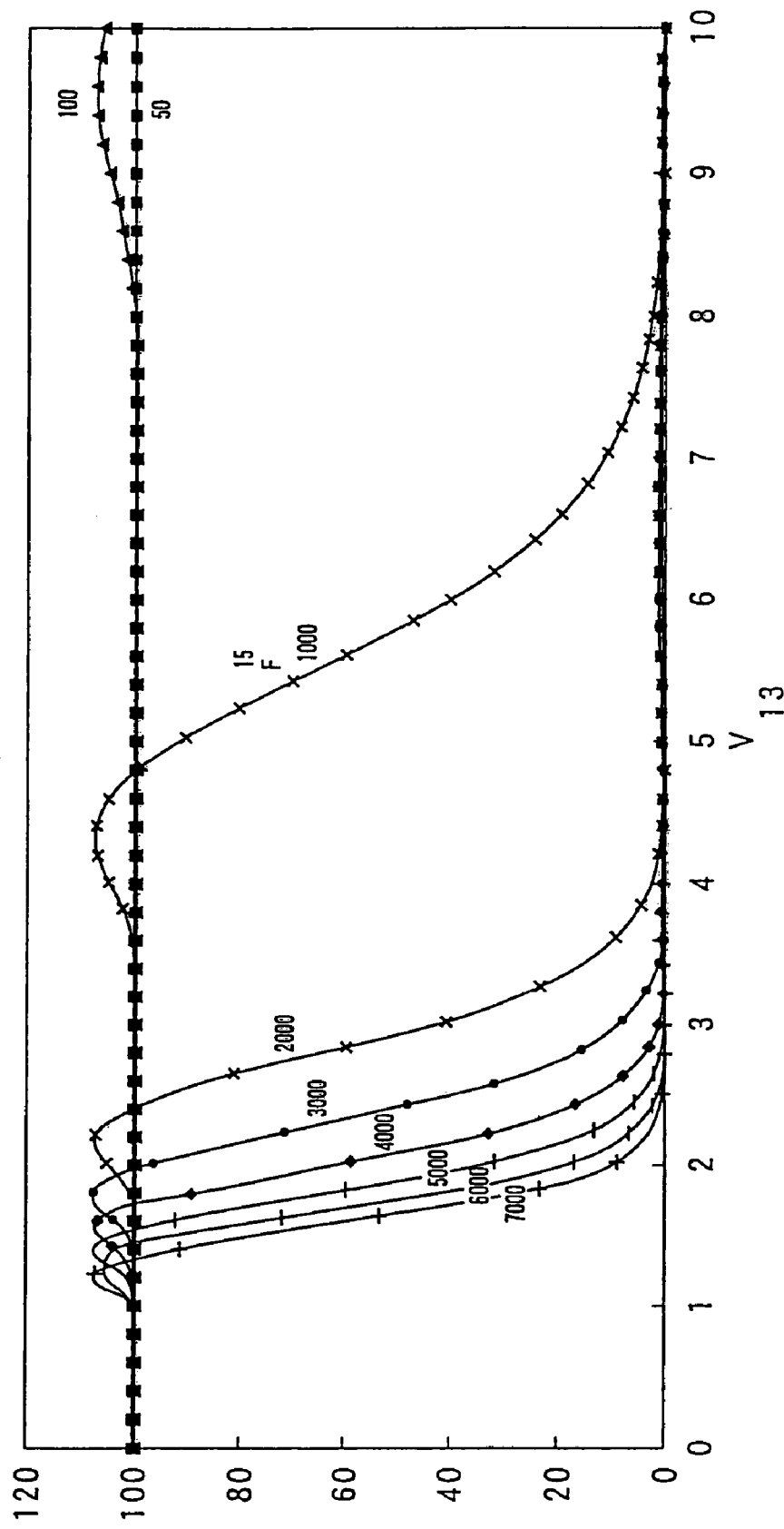
FIG. 3 is a view showing a relative light transmittance in relation to an applied effective value voltage in an example of the present invention.
Figure 4:
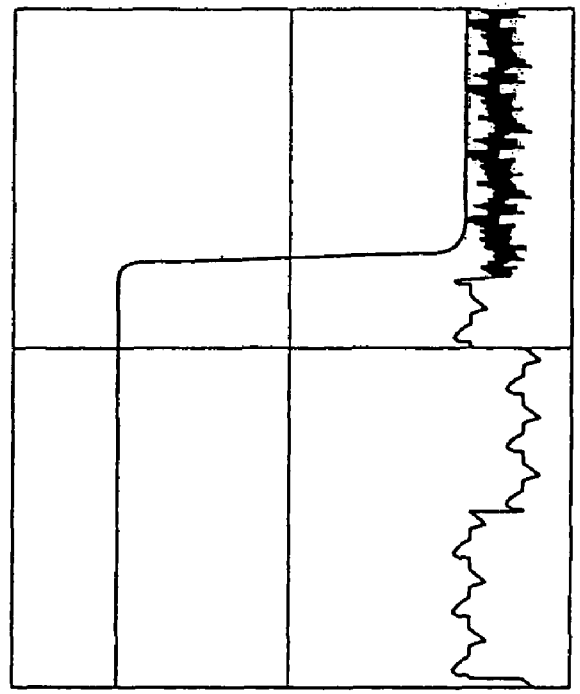
FIG. 4 is a view showing an electro-optical response wave form in an example of the present invention.

According to the following method, the light relative transmittance in relation to applied effective value voltage and an electro-optical response wave form were measured. The results are shown in FIG. 3 and FIG. 4.

[1] Light Relative Transmittance in Relation to Effective Value of Applied Voltage Light relative transmittance in relation to effective value of applied voltage was measured using the frequency, when the amount of an Ag nanoparticle is 1 wt %, as a parameter.

[2] Electro-Optical Response Wave Form

Electro-optical response wave forms of $f_1 \rightarrow f_2$ (rising, bright→dark) and $f_2 \rightarrow f_1$ (falling, dark→bright) are shown when the effective value of applied voltage is 4V, and the frequency $f_1=10$ Hz and $f_2=12$ kHz. The rising response time is 2.6 ms and the falling response time is 9.2 ms.

What is claimed is:

1. A liquid crystal device element comprising: a pair of parallel substrates; conductive layers provided respectively on facing inner surfaces of these substrates; liquid crystal alignment layers provided respectively with pre-tilt angle on facing inner surfaces of these conductive layers, and a liquid crystal layer formed in between these pair of liquid crystal alignment layers, wherein the liquid crystal layer has liquid crystal-soluble particles dissolved or dispersed in a matrix liquid crystal, wherein each of the liquid crystal-soluble particles comprises a core having a diameter smaller than 100 nm and comprising one or a plurality of nanoparticles, and a protective layer comprising liquid crystal molecules or liquid crystal-like molecules provided on a periphery of the core, wherein a control circuit of applying voltage, while modulating at least frequency among frequency and voltage, is provided on the conductive layer for varying light transmittance of the liquid crystal layer, and wherein the matrix liquid crystal, in which the liquid crystal-soluble particles are dissolved or dispersed, shows an electro-optical response such that a voltage at which the matrix liquid crystal starts its response changes depending on a frequency of applied electric field, wherein under a constant applied voltage, an electro-optical response is turned on by switching the frequency of applied electric field from low frequency to high frequency, and the electro-optical response is turned off by switching the frequency from high frequency to low frequency, and wherein a frequency modulation range of the electro-optical response can be changed freely from 20 Hz to 100 kHz.

2. The liquid crystal device element according to claim 1, wherein a time constant of response concerning turning the electro-optical response on and off is in a range of 0.1 ms to 10 ms.

3. The liquid crystal device element according to claim 1, wherein the nanoparticle constituting the liquid crystal-soluble particle is at least one kind of metal atom selected from Ag, Pd, Au, Pt, Rh, Ru, Cu, Fe, Co, Ni, Sn and Pb.

4. A method for driving a liquid crystal device element, wherein the liquid crystal device element according to claim 1 is driven by using an active matrix mode.

5. The liquid crystal device element according to claim 1, wherein the short axis width of the liquid crystal molecule or liquid crystal-like molecule is equal to or less than the diameter of the core.

* * * * *